United States Patent [19]
Kincart

[11] Patent Number: 5,806,736
[45] Date of Patent: Sep. 15, 1998

[54] EXTERIOR DUAL CARGO CARRIER

[76] Inventor: Mark S. Kincart, 19511 N. 53rd Dr., Glendale, Ariz. 85308

[21] Appl. No.: 636,568

[22] Filed: Apr. 23, 1996

[51] Int. Cl.⁶ .................................................. B62D 43/02
[52] U.S. Cl. ...................... 224/509; 224/513; 224/42.13; 224/42.15; 224/42.21; 224/548
[58] Field of Search .................................... 224/509, 495, 224/512, 513, 517, 42.13, 42.15, 42.21, 42.28, 546, 548, 282

[56] References Cited

U.S. PATENT DOCUMENTS

| | | | |
|---|---|---|---|
| 3,658,201 | 4/1972 | Williams et al. | 224/42.13 X |
| 4,006,852 | 2/1977 | Pilsner et al. | 224/509 |
| 4,282,994 | 8/1981 | Hilliard | 224/509 |
| 4,327,849 | 5/1982 | Sharpton | 224/42.13 X |
| 4,756,457 | 7/1988 | Polk | 224/509 |
| 5,026,107 | 6/1991 | Hess | 296/37.2 |
| 5,137,192 | 8/1992 | Sheridan et al. | |
| 5,222,640 | 6/1993 | Teson | 224/42.24 |
| 5,372,287 | 12/1994 | Deguevara | |
| 5,427,287 | 6/1995 | Harrison | 224/42.21 |
| 5,427,289 | 6/1995 | Ostor | |

Primary Examiner—Renee S. Luebke
Attorney, Agent, or Firm—Snell & Wilmer, L.L.P.

[57] ABSTRACT

A cargo carrier for a vehicle is presented that is a removable multi-mount device. The device includes a first cargo carrier apparatus having an end that is removably connected to one side of the rear exterior of the vehicle and a second cargo carrier apparatus that also has an end that is removably connected to the opposite side of the rear exterior of the vehicle. The first and second cargo apparatus can be connected to one another so that they continuously extend across the rear exterior of the vehicle.

8 Claims, 3 Drawing Sheets

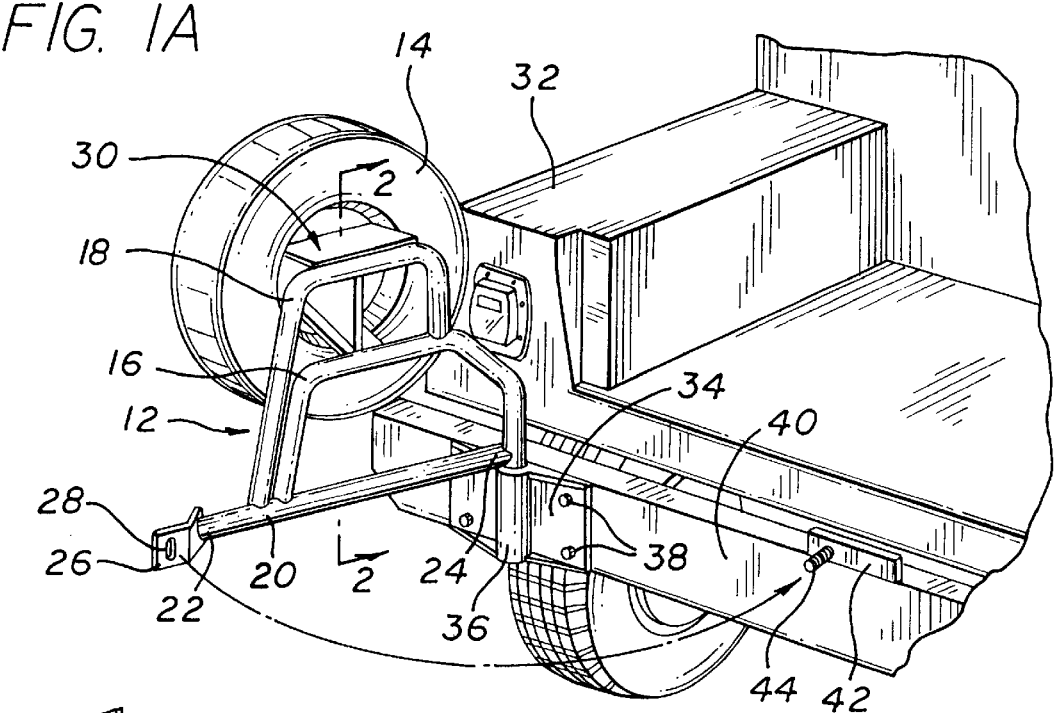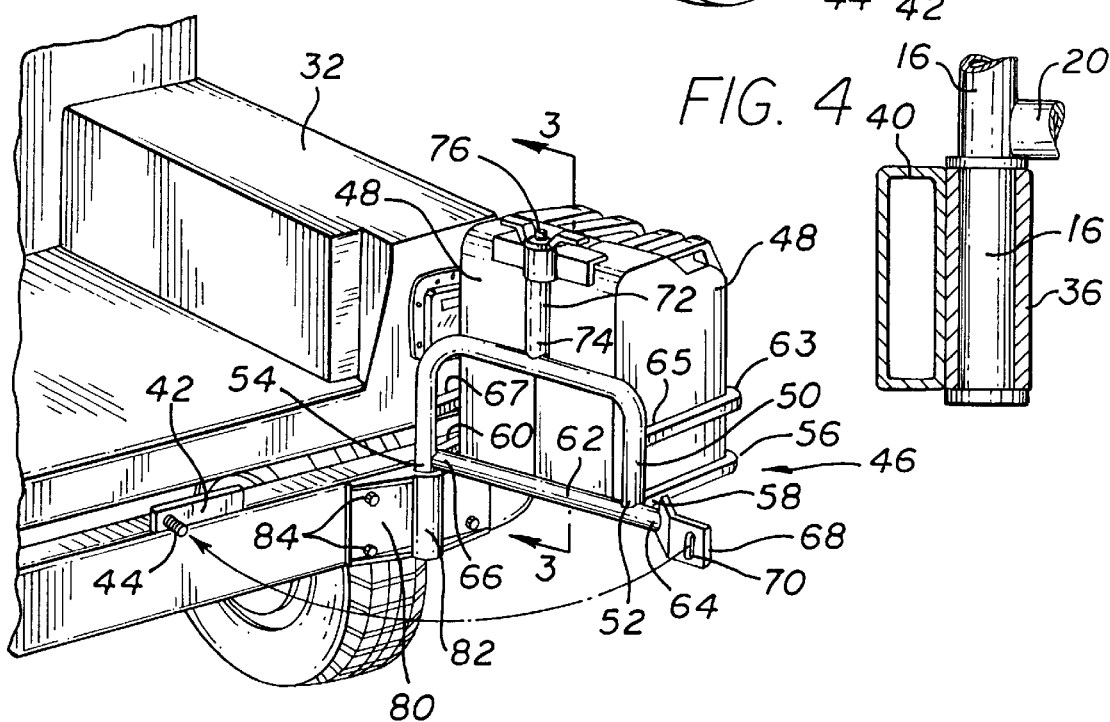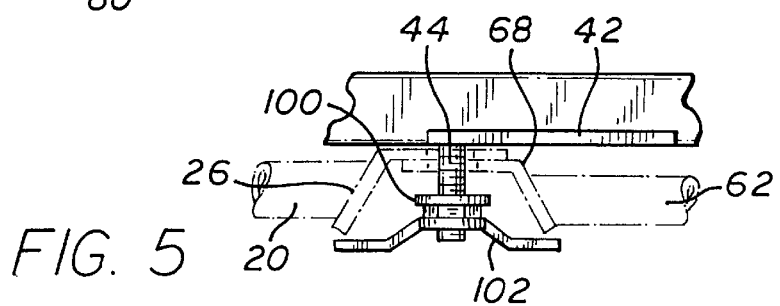

EXTERIOR DUAL CARGO CARRIER

FIELD OF THE INVENTION

The present invention relates generally to a tire and fuel can mount for vehicles. More particularly, the present invention relates to a rear mount apparatus for storing a spare tire and extra fuel cans which comprises a spare tire mount and fuel can rack which are removably connected to one another at the center rear location of a motor vehicle. Further, the rear mount apparatus is a multi-mount apparatus that enables the spare tire mount and fuel can rack to each be easily removed so that alternative types of mounts such as bike mounts, cargo mounts, etc. can be seated in their place.

The tire and fuel can mount is especially well designed for use with four wheel drive vehicles and other all-terrain vehicles in that the inventive mount can be easily adapted and secured to the rear of the vehicle thereby making the spare tire and extra fuel cans easily accessible for use.

BACKGROUND OF THE INVENTION

Several devices exist for carrying articles such as skis, bicycles, spare tires, wheelchairs, etc. on the exterior of a vehicle. Some of these devices are detachable while some are designed to be permanently affixed to the exterior of a vehicle. Further, some of the detachable devices are designed such that they can be mounted to existing exterior mounts already located on the vehicle, such as an exterior tire mount. For example, U.S. Pat. No. 5,137,192 issued to Sheridan et al. discloses a carrier rack apparatus that is mountable to a vehicle's rear door spare tire mount. The carrier rack apparatus generally includes a mounting hub that is sandwiched between an existing spare tire mount located on the vehicle's rear door and the wheel of the spare tire that is carried on the door. A detachable carrier rack is then mounted to the mounting hub. The detachable carrier rack may comprise several design variations that are capable of carrying items such as bicycles, skis, a gas can, etc.

Another example of a detachable mounting device that can be mounted to a vehicle's existing exterior tire mount is disclosed in U.S. Pat. No. 5,372,287 issued to Deguevara. The Deguevara patent describes an article carrier comprises a tubular member affixed to a vehicle, or a spare tire carrier located on the exterior of the vehicle, a connector member which can be telescopically received within the tubular member, and a carrier assembly carried by the connector member. The article carrier assembly includes a generally vertically extending column and one or more outwardly extending article support elements which are connected to the vertical extending column by a second telescopic assembly.

U.S. Pat. No. 5,427,289 issued to Ostor discloses a collapsible vehicle attached demountable carrier which can be detachably mounted onto the trailer hitch of a vehicle. The carrier has a width corresponding to the width of the vehicle and comprises a hinged tray or shelf that is lowered to support and carry a load. The carrier is collapsible into a vertical position when not being utilized to carry a load.

Other known types of carrier devices have been specifically designed to mount spare tires to the exterior of vehicles. For example, U.S. Pat. No. 5,026,107 issued to Hess describes a vehicle spare tire storage apparatus for storing a tire beneath a vehicle, such as beneath the bed of a pick-up truck. The vehicle spare tire storage apparatus includes first and second spaced apart support bars which extend between, and are mounted to, extending portions of first and second pairs of suspension arms. The first support bar is detachably coupled to one of the first pair of suspension arms so that it is rotatable with respect to the other one of the first pair of suspension arms. This facilitates removal of the spare tire from beneath the vehicle.

U.S. Pat. No. 5,222,640 issued to Teson discloses a spare tire mount for pick-up trucks that is secured to the side rail of pick-up trucks for simple and efficient storage of the tire on the mount. The spare tire mount comprises a support member having a horizontal threaded aperture formed therein wherein the support member engages the outward facing lip of the pickup sidewall, an elongated threaded member having an end adjustably positionable against the inner surface of the sidewall, and a handle member for assisting in threading the elongated threaded member within the support member.

Further, U.S. Pat. No. 5,427,287 issued to Harrison discloses a spare tire carrier for carrying one or more spare tires with an on-off road utility vehicle. The spare tire carrier includes a base, a base arm, a platform, and a platform arm. The Harrison spare tire carrier is rotatably mounted on the roll bar of any on-off road utility vehicle which allows the spare tire to be carried either inside or outside the passenger or cargo area of the on-off road utility vehicle.

Although the previously described patents comprise only a small example of the spare tire and article carrying devices available for motor vehicles, it is apparent that most carrier devices focus on providing an additional cargo space for hauling additional items on the exterior of a vehicle. There is some variation and economy employed by those carrier devices which are detachably mounted to already existing exterior mounts such as on existing spare tire mounts located on the exterior of a vehicle. Accordingly, there is a need for a dual cargo carrier mount on the exterior of a vehicle that allows quick and easy access to a vehicle's interior if the cargo carrier blocks access to the interior of the vehicle. An exterior dual cargo carrier mount becomes especially important for those all-terrain vehicles which are designed for long cross country trips and excursions in which storage space within the interior of the vehicle is at a minimum.

SUMMARY OF THE INVENTION

It is a principal object of the present invention to provide an exterior dual cargo carrier mount for four wheel drive and all-terrain motor vehicles which is fitted on the rear exterior of the motor vehicle.

It is another object of the present invention to provide an exterior dual cargo carrier mount for four wheel drive and all-terrain vehicles that is capable of easy detachment from the vehicle for replacement with other various multiple dual cargo carrier mounts.

It is a further object of the present invention to provide an exterior dual cargo carrier mount for a four-wheel drive or all-terrain vehicle that is designed for carrying a spare tire and one or more spare fuel cans.

It is still a further object of the present invention to provide a spare tire and fuel can carrier mount for four-wheel drive and all-terrain vehicles that provides easy access to the interior of the vehicles.

It is yet a further object of the present invention to provide a removable spare tire and fuel can carrier mount for four-wheel drive and all-terrain vehicles.

According to a broad aspect of the invention, there is provided a dual cargo carrier which includes a first cargo carrier apparatus, a second cargo carrier apparatus, and a means for connecting the first and second cargo carrier apparata at a near center exterior of a vehicle. The dual cargo carrier also includes means for the easy removal and replacement of other various multiple dual cargo carrier mounts such as mounts for hauling skis, extra gear, bicycles, etc.

BRIEF DESCRIPTION OF THE DRAWINGS

FIG. 1A is a perspective view of the removable exterior dual cargo carrier of the present invention in an open position showing a spare tire cargo area and a spare tire mounted on the same.

FIG. 1B is a perspective view of the removable exterior dual cargo carrier of the present invention in an open position showing a spare fuel tank cargo area and two spare fuel tanks mounted on the same.

FIG. 4 is a cross-sectional view of the vehicle attachment area of the removable exterior dual cargo carrier of the present invention taken along line 4—4 of FIG. 2.

FIG. 5 is a top elevational view of the securing means for connecting the spare tire cargo area and the spare fuel tank cargo area of the removable exterior dual cargo carrier to a vehicle with portions of the cargo areas shown in phantom.

DETAILED DESCRIPTION OF THE PREFERRED EMBODIMENT

Figure 2:
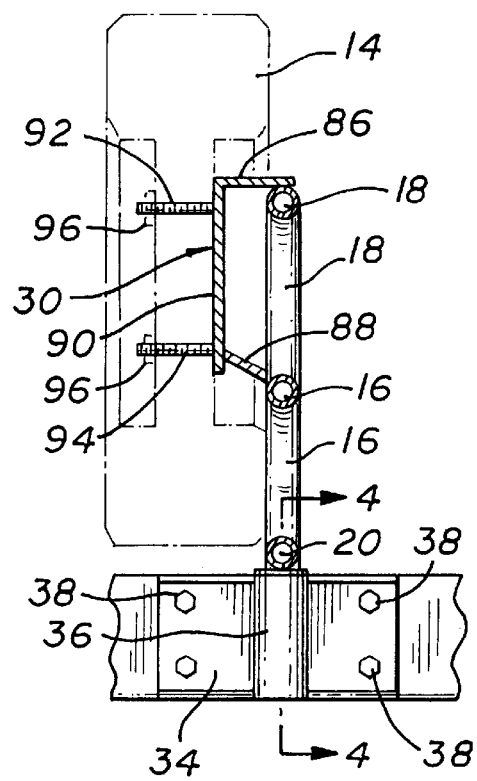
FIG. 2 is a cross-sectional view of the spare tire cargo area of the removable exterior dual cargo carrier of the present invention taken along line 2—2 of FIG. 1A.

In accordance with the preferred embodiment of the present invention, FIG. 1A illustrates a prospective view of the removable exterior dual cargo carrier 10 of the present invention in an open position showing a spare tire cargo area 12 and a spare tire 14 mounted within the spare tire cargo area 12. The spare tire cargo area 12 of the removable exterior dual cargo carrier 10 generally includes a first support bar 16 having a substantially inverted "U" shape, a second support bar having a substantially inverted hook like shape wherein the longer side of said hook like shape is connected adjacent to a side of the substantially inverted "U" shaped first support bar 16 and the smaller hook side of the second support bar 18 is connected to a top of the substantially inverted "U" shaped first support bar 16. A third horizontal support bar 20 extends outward from a bottom end of the substantially inverted "U" shaped first support bar 16 such that parallel connected ends of the first support bar 16 and second support bar 18 are connected to a mid-portion of the third support bar 20. The third support bar 20 comprises a first end 22 and a second end 24. As previously mentioned, the second end 24 of the third support bar 20 is connected to a bottom end portion of the substantially inverted "U" shaped first support bar 16. The first end 22 of the third support bar 20 is connected to a first latch element 26 having a first opening therein 28. A bracket element 30 is attached to the tops of the first and second support bars 16, 18 to provide a mount for the spare tire 14.

The means for connecting the spare tire cargo area 12 of the removable exterior dual cargo carrier 10 of the present invention to a four-wheel drive or all-terrain vehicle 32 comprises a rectangular shaped bracket 34 having a hollow cylindrical member 36 such that an extended portion of the substantially inverted "U" shaped first support bar 16 can fit circumferentially within the hollow cylindrical member 36 of the rectangular shaped bracket 34. The design of the rectangular shaped bracket 34 which comprises the hollow cylindrical member 36 allows for several different types of cargo area apparata to be removably mounted to the rectangular shaped bracket 34 at the rear of the vehicle 32. Accordingly, individuals can customize the exterior dual cargo carrier to haul a variety of predetermined cargos. The rectangular shaped bracket 34 also comprises a series of openings (not shown) which enable the rectangular shaped bracket 34 to be secured to the four-wheel drive or all-terrain vehicle 32 by placing bolts 38 through the openings in the rectangular shaped bracket 34 and corresponding openings (not shown) which are drilled within a bumper portion 40 of the four-wheel drive or all-terrain vehicle 32.

A second bracket 42 is permanently secured to a center top portion of the bumper 40 of the four-wheel drive or all-terrain vehicle 32. The second bracket 42 includes a pin member 44 which extends outward from the second bracket 42 to enable the first opening 28 contained in the first latch element 26 to fit over the pin member 44 when the removable exterior dual cargo carrier 10 is in the closed position.

A prospective view of the removable exterior dual cargo carrier 10 of the present invention in an open position showing a spare fuel tank cargo area 46 and two spare fuel tanks 48 mounted within the spare fuel tank cargo area 46 is shown in FIG. 1B. The spare fuel tank cargo area 46 generally comprises a first substantially inverted "U" shaped support bar 50 having a first end 52 and a second end 54, a second horizontal "U" shaped support bar 56 having a first end 58 and a second end 60 wherein the first and second ends 58, 60 of the second support bar are connected to the first and second ends 52, 54 of the first support bar 50 such that the first support bar 50 and second support bar 56 are in a perpendicular relationship to one another. A horizontal third support bar 62 having a first end 64 and a second end 66 is connected to the first support bar 50 such that the first end 52 of the first support bar 50 is connected near the first end 64 of the third support bar 62 and the second end 60 of the third support bar 62 is connected near the second end 54 of the first support bar 50.

An optional fourth horizontal "u" shaped support bar 63 having a first end 65 and a second end 67 wherein the first and second ends 65, 67 of the fourth additional support bar 63 are connected to mid portions of the first support bar 50 such that the first support bar 50 and the optional fourth horizontal support bar 63 are in a perpendicular relationship to one another. This positioning also results in the optional fourth horizontal support bar 30 being in parallel alignment with, and just above, the second support bar 56.

A second latch element 68 having a second opening therein 70 is connected to the first end 64 of the horizontal third support bar 62. A fourth vertical support bar 72 having a first end 74 and a second end 76 is connected to the first support bar 50 such that the first end 74 of the fourth vertical support bar 72 is connected to a top center portion of the first substantially inverted "U" shaped support bar 50 such that it extends vertically upward from the first support bar 50. A means 78 for retaining the spare fuel tanks 48 within the spare fuel tank cargo area 46 is later described in detail with reference to FIG. 9.

Like the spare tire cargo area 12 of the removable exterior dual cargo carrier 10 of the present invention, the spare fuel tank cargo area 46 of the present invention also includes a means for connecting the spare fuel tank cargo area 46 to the four-wheel drive or all-terrain vehicle. The connection means comprises a third rectangular shaped bracket 80 having a second hollow cylindrical member 82 contained therein and a second series of openings (not shown) which are used to fasten the third rectangular shaped bracket 80 to a bumper portion 40 of the four-wheel drive or all-terrain vehicle 32. The series of openings contained within the third rectangular shaped bracket 80 are aligned with a series of openings contained within the bumper 40 of the four-wheel drive or all-terrain vehicle 32 and bolts 84 are inserted through the aligned holes in order to secure the third rectangular shaped bracket 80 to the bumper 40 of the four-wheel drive or all-terrain vehicle 32. The same second bracket 42 and pin member 44 are used to secure the second latch element 68 to the center rear of the four-wheel drive or all-terrain vehicle 32 when the removable exterior dual cargo carrier 10 is in the closed position.

As previously mentioned with respect to rectangular shaped bracket 34 and hollow cylindrical member 36, the design of the third rectangular shaped bracket 80 having the second hollow cylindrical member 82 allows for a variety of different cargo apparata to be removably mounted to the third rectangular shaped bracket 80. For example, a cargo area apparata for transporting a bicycle instead of the space fuel tank cargo area 46 could be mounted within the second hollow cylindrical member 82 of the third rectangular shaped bracket 80.

Turning now to FIG. 2, there is shown a cross sectional view of the spare tire cargo area 12 of the removable exterior dual cargo carrier 10 of the present invention taken along line 2—2 of FIG. 1A. At a center cross sectional area of the spare tire cargo area 12, the first, second, and third support bars 16, 18, 20 are shown vertically disposed horizontal alignment with one another. The support mount element 30 includes a top shelf member 86, a bottom support member 88, a vertical support plate 90 which attaches the top shelf member 86 to the bottom support member 88, and first and second rod members 92, 94 extending outwardly perpendicular from the vertical support plate 90 thereby enabling holes within the wheel well of the tire 14 to be positioned thereon and secured to the support mount element 30 via nuts 96.

Figure 3:
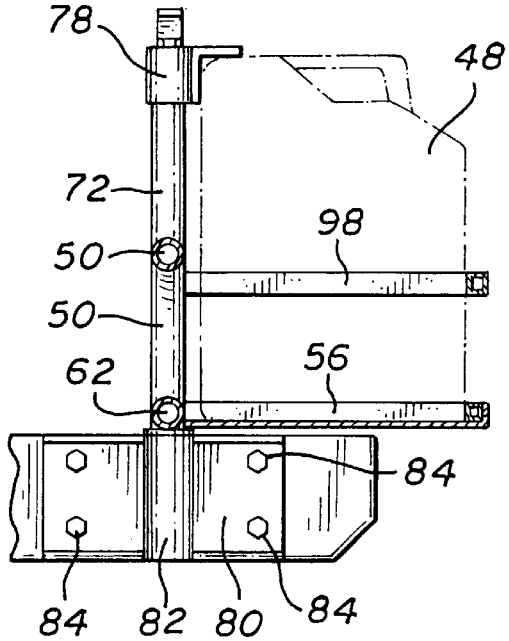
FIG. 3 is a cross-sectional view of the spare fuel tank cargo area of the removable exterior dual cargo carrier of the present invention taken along line 3—3 of FIG. 1B.

A cross sectional view of the spare fuel tank cargo area 46 of the removable exterior dual cargo carrier 10 taken along line 3—3 of FIG. 1B is shown in FIG. 3. A first support bar member 50 and third support bar member 62 are shown in vertical alignment with one another in the cross sectional view. The fourth support bar 72 is in vertical alignment with the cross sectional portions of the first support bar 50 and third support bar 62. The second support bar 56 wraps around the base of the fuel tanks 48 which are shown in phantom. A strap member 98 may be used to further secure the mid-portion of the spare fuel tanks 48 to the first support bar 50 of the spare fuel tank cargo area 46.

FIG. 4 shows a cross sectional view of one of the vehicle attachment areas of the removable exterior dual cargo carrier 10 of the present invention. The cross sectional view in FIG. 4 is taken along line 4—4 of FIG. 2. In order to attach the spare tire cargo area 12 of the removable exterior dual cargo carrier 10 to the four-wheel drive or all-terrain vehicle 32, the rectangular shaped bracket 34 and its hollow cylindrical member 36 are secured to the bumper 40 of the four-wheel drive or all-terrain vehicle 32. The first support bar 16 is then fitted and retained concentrically within the hollow cylindrical member 36 of the rectangular shaped bracket 34. The first support bar 16 is rotatable within the hollow cylindrical member 36 of the rectangular shaped bracket 34. This rotatable movement facilitates the opening and closing of the removable exterior dual cargo carrier 10.

FIG. 5 illustrates the means for securing and connecting the spare tire cargo area 12 and the spare fuel tank cargo area 46 of the removable exterior dual cargo carrier 10 to the four-wheel drive or all-terrain vehicle 32. To secure the removable exterior dual cargo carrier 10 in the closed position, the first opening 28 and the first latch element 26 of the spare tire cargo area 12 is placed over the pin member 44 of the second bracket 42. Next, the second opening 70 and the second latch element 68 of the spare fuel tank cargo area 46 is placed over the pin member 44 of the second bracket 42 such that the first opening 28 and second opening 70 are in alignment with one another and the first latch element 26 and second latch element 68 are adjacent to one another near their respective openings. A washer 100 and then wing nut 102 are placed over the pin member 44 of the second bracket 42 and the wing nut 102 is threaded about the pin member 44 until it is securely tightened.

It should be noted that the spare tire cargo area 12 and spare fuel tank cargo area 46 may be positioned on sides opposite those sides which are depicted in the figures. However, the removable exterior dual cargo carrier 10 opens and closes at the center of the rear exterior of the vehicle 32. Further, although the support bars which comprise the spare tire cargo area 12 and spare fuel tank cargo area 46 are shown as hollow tubular structures, they may also exist as hollow or solid elongated structures in any geometric configuration including square and rectangular configurations. All of the support bars which comprise the removable exterior dual cargo carrier 10 of the present invention are preferably comprised of strong, sturdy and durable metals such as coldroll steel, stainless steel, or chromally.

Figure 6:
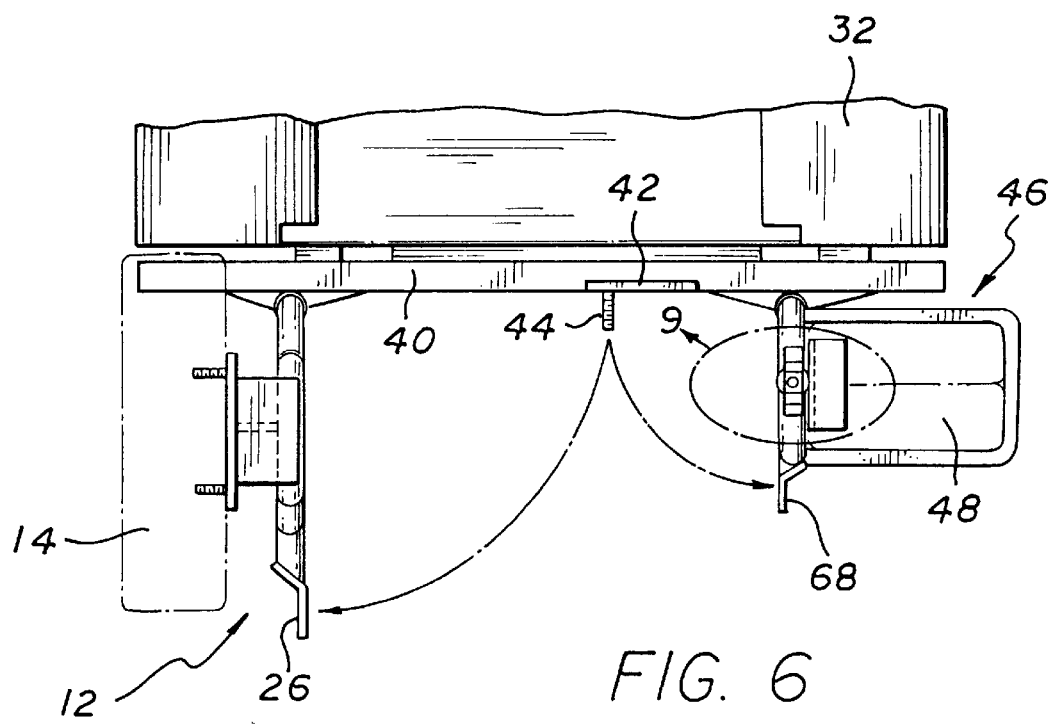
FIG. 6 is a top elevational view of the removable exterior dual cargo carrier of the present invention shown in the open position with the spare tire and spare fuel cans shown in phantom.

FIG. 6 shows a top elevational view of the removable exterior dual cargo carrier 10 of the present invention in the open position. As previously indicated, opposite ends of this spare tire cargo area 12 and spare fuel tank cargo area 46 are connected and secured within a center rear exterior portion of the vehicle 32.

Figure 7:
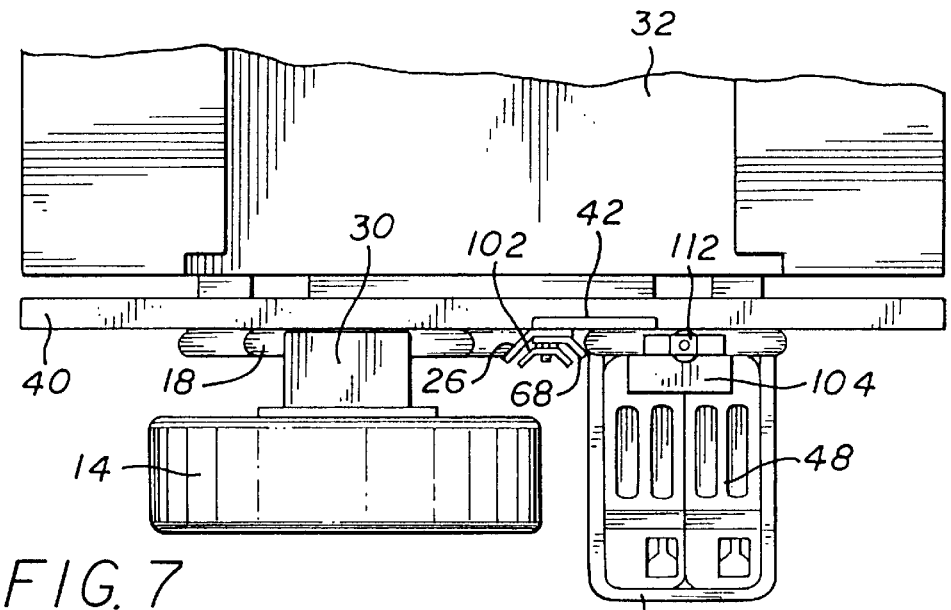
FIG. 7 is a top elevational view of the removable exterior dual cargo carrier of the present invention shown in the closed position with the spare tire and spare fuel cans shown mounted on the carrier.
Figure 8:
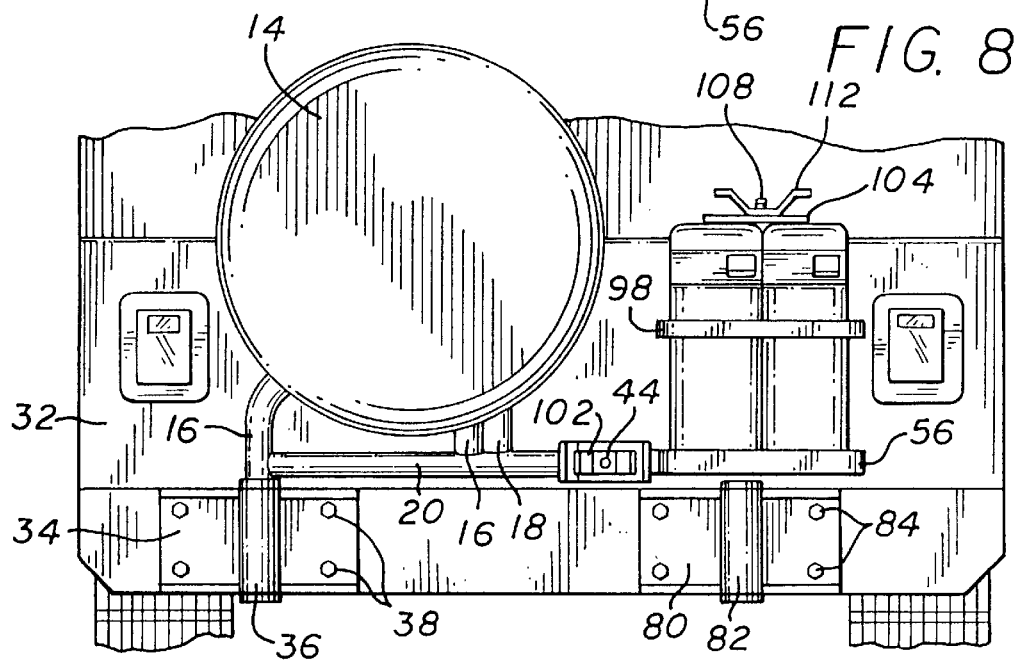
FIG. 8 is a front elevational view of the removable exterior dual cargo carrier of the present invention shown closed and mounted to the rear exterior of a vehicle with the spare tire and spare fuel cans shown mounted to the carrier.

A top elevational view of the removable exterior dual cargo carrier 10 of the present invention is shown in the closed position in FIG. 7. The respective halves of the removable exterior dual cargo carrier 10, namely the spare tire cargo area 12 and the spare fuel tank cargo area 46, are shown connected via first and second latch elements 26, 68 which are secured with wing nut 102. FIG. 8 shows a front elevational view of the removable exterior dual cargo carrier 10 of the present invention in the same closed position.

Figure 9:
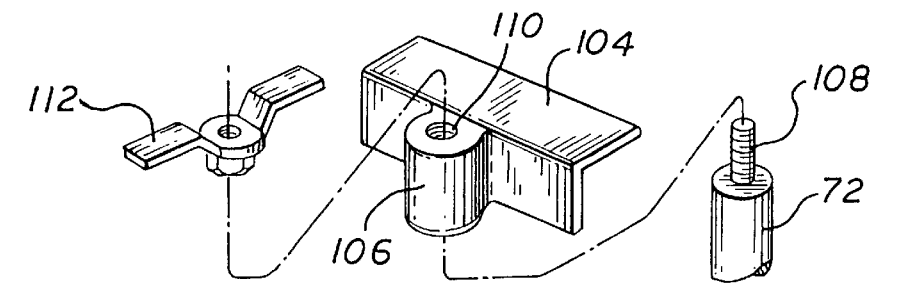
FIG. 9 is an exploded view of the means for securing the spare fuel cans within the spare fuel can cargo area of the removable exterior dual cargo carrier of the present invention.

Turning finally to FIG. 9, there is shown an exploded view of the means for securing the spare fuel cans 48 within the spare fuel can cargo area 46 of the removable exterior dual cargo carrier 10 of the present invention. More specifically, fourth bracket 104 includes a hollow tubular shaped member 106 which is designed to fit over the fourth vertical support bar 72 of the spare fuel tank cargo area 46. The top or second end 76 of the fourth vertical support bar 72 contains a threaded element 108 which fits through an opening 110 within the top of the hollow tubular shaped member 106. In order to secure the spare fuel tanks 48 within the spare fuel tank cargo area 46, the fourth bracket 104 is placed over the threaded element 108 of the fourth vertical support bar 72 and the top of the spare fuel cans 48, respectively. Next, a second wing nut 112 is wound about the threaded element 108 to secure a fourth bracket 104 against the top of the spare fuel cans 48.

While the invention has been described and disclosed with reference to the preferred embodiment, those skilled in the art will understand and appreciate that variations in the basic design or substitution of materials may be made, but still fall within the intended scope of the invention, which is to be limited only by the claims appended hereto.

I claim:

1. A dual cargo carrier for attachment to a rear exterior of a vehicle comprising:

a first cargo carrier apparatus having a horizontal support bar, an inverted "U" shaped support bar connected to a top and an end of said horizontal support bar and an inverted hook shaped support bar having a first end connected to the top of said horizontal support bar and a second end connected to a top of said inverted "U" shaped support bar;

a second cargo carrier apparatus having a second inverted "U" shaped support bar with first and second ends, a horizontal "U" shaped support bar with first and second ends connected to said second inverted "U" shaped support bar in a perpendicular relationship, and a second horizontal support bar connected to the second inverted "U" shaped support bar and horizontal "U" shaped support bar near their respective ends; and means for connecting said first cargo carrier apparatus and said second cargo carrier apparatus at a center of the rear exterior of the vehicle.

2. The dual cargo carrier of claim 1 wherein said first and second cargo carrier apparatus are detachable from the vehicle.

3. The dual cargo carrier of claim 1 wherein said first cargo carrier apparatus comprises a spare tire mount.

4. The dual cargo carrier of claim 1 wherein said second cargo apparatus comprises an area for storing at least one spare fuel tank.

5. The dual cargo carrier of claim 1 wherein said means for connecting said first cargo carrier apparatus and said second cargo carrier apparatus comprises:

a first latch element connected to said first cargo carrier apparatus, said first latch element having an opening therein;

a second latch element connected to said second cargo carrier apparatus, said second latch element having an opening therein; and a bracket secured to the vehicle wherein said bracket includes a pin member extending outwardly from said bracket for receiving the openings of said first and second latch elements.

6. The dual cargo carrier of claim 1 further comprising:

means for removably connecting said first cargo carrier apparatus to a first side of the rear exterior surface of the vehicle; and means for removably connecting said second cargo carrier apparatus to an opposite second side of the rear exterior surface of the vehicle.

7. The dual cargo carrier of claim 6 wherein said means for removably connecting said first cargo carrier apparatus comprises a bracket having a hollowed out area for receiving an end of said inverted "U" shaped support bar wherein said bracket is secured to the rear exterior surface of the vehicle.

8. The dual cargo carrier of claim 6 wherein said means for removably connecting said second cargo carrier apparatus comprises a bracket having a hollowed out area for receiving an end of said second inverted "U" shaped support bar wherein said bracket is secured to the rear exterior surface of the vehicle.

* * * * *